US008724211B2

(12) United States Patent
Huang et al.

(10) Patent No.: US 8,724,211 B2
(45) Date of Patent: May 13, 2014

(54) DRIVING METHODS OF DISPLAY UNIT

(75) Inventors: Yao-Ching Huang, Taoyuan Hsien (TW); Chang-Jing Yang, Taoyuan Hsien (TW); Jau-Shiu Chen, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 261 days.

(21) Appl. No.: 13/206,398

(22) Filed: Aug. 9, 2011

(65) Prior Publication Data

US 2012/0038971 A1 Feb. 16, 2012

(30) Foreign Application Priority Data

Aug. 10, 2010 (TW) ................................ 99126555 A

(51) Int. Cl.
*G02B 26/00* (2006.01)
*G09G 3/34* (2006.01)

(52) U.S. Cl.
USPC ........................................... 359/296; 345/107

(58) Field of Classification Search
USPC ........................................................... 345/107
See application file for complete search history.

(56) References Cited

U.S. PATENT DOCUMENTS

2007/0052669 A1* 3/2007 Zhou et al. .................... 345/107
2007/0247417 A1* 10/2007 Miyazaki et al. ............. 345/107

* cited by examiner

*Primary Examiner* — Alexander Eisen
*Assistant Examiner* — Amit Chatly
(74) *Attorney, Agent, or Firm* — Muncy, Geissler, Olds & Lowe, P.C.

(57) ABSTRACT

An embodiment of the invention provides a driving method for a display unit, wherein the display unit includes a first electrode, and a second electrode disposed opposite to the first electrode, wherein the first electrode is separated from the second electrode by a distance, and a first particle with a polarity is distributed between the first electrode and the second electrode. The driving method includes the steps of: casting a first voltage difference between the first electrode and the second electrode to make the first particle move toward the second electrode; stopping casting of the first voltage difference; and casting a second voltage difference between the first electrode and the second electrode to apply an opposite force to the first particle, wherein the polarity of the second voltage difference is different from that of the first voltage difference.

20 Claims, 5 Drawing Sheets

DRIVING METHODS OF DISPLAY UNIT

CROSS REFERENCE TO RELATED APPLICATIONS

This Application claims priority of Taiwan Patent Application No. 99126555, field on Aug. 10, 2010, the entirety of which is incorporated by reference herein.

BACKGROUND OF THE INVENTION

1. Field of the Invention

The present invention relates to a driving method of a display unit and in particular relates to a charged-particle driving method which can protect a display unit from damaged and increase contrast thereof.

2. Description of the Related Art

The technology focus on a closed space that comprises two electrodes and a spacer, wherein at least one of the two electrodes is transparent. Further, at least one charged-particle with a color dye is distrusted in the closed space. The charged-particle is driven by applying a voltage difference on the two electrodes to generate an electrical field.

Please refer to FIG. 1 which is a schematic of a conventional display unit and a driving method thereof. The conventional display unit has two different driving methods that are respectively shown in the upper part and the bottom part of FIG. 1. For simplification, the driving methods shown in the FIG. 1 are discussed first in the following paragraphs. As shown in FIG. 1, a display unit 1 comprises at least a first electrode 11, a second electrode 13, a first particle 15 and a second particle 17, wherein the first electrode 11 is separated from the second electrode 13 by a distance, and the first particle 15 and the second particle 17 are charged and filled in a space therebetween, and a body of a display apparatus (not shown in FIG. 1). By casting voltage to the first electrode 11 and the second electrode 13 simultaneously or separately, a voltage difference or an electrical field $V_2$ is generated so as to drive the first particle 15 and the second particle 17. In this conventional display unit 1, the first particle 15 moves toward the second electrode 13, and the second particle 17 moves toward the first electrode 11.

Please refer to the upper part of FIG. 1. In order to seek better contrast performance of the display unit 1, the conventional driving method uses the PWM method to drive the display unit 1 and the desired contrast of the display unit 1 can be achieved by adjusting the ON/OFF duration, ratio and the number of pulses. An optimal situation is where the electrical field or a voltage difference $V_2$ generated during the ON duration is large enough to move the particles 15 and 17, and the energy got during the ON duration is large enough to move the particles 15 and 17 until energy exhaustion during the OFF duration, wherein the voltages are turned off during the OFF duration and the particles 15 and 17 are assumed not affected by any other external electric fields. Similarly, the driving method shown in the bottom part of FIG. 1 casts a voltage difference $-V_1$ between the first electrode 11 and the second electrode 13, wherein the voltage difference $-V_1$ is an inverse voltage of the voltage difference $V_2$. The voltage difference $-V_1$ drives the first particle 15 to move from the first electrode 11 to the second electrode 13, and drives the second particle 17 to move from the second electrode 13 to the first electrode 11. The driving method shown in the bottom part of FIG. 1 uses the PWM method to drive the display unit 1 and the desired contrast of the display unit 1 can be achieved by adjusting the ON/OFF duration, ratio and the number of pulses.

There are three ways to vanish the energy: (1) inter-molecular force between particles; (2) hitting other particles or the spacer of the electrode; (3) inter-molecular force between the particle and medium of the closed spaced formed by the two electrodes and the spacer. Due to the unfavorable factors of the characteristic of the particles, the position of the particles, the uniformity of the medium, the attraction force and the repulsion force, the driving method usually uses a single pulse signal with a relative long driving time duration to drive the particles. But to overcome the described unfavorable factors, the driving method uses multiple pulses with relative short driving time duration to drive the particles. Thus, the particles can be stopped at the electrode and are uniformly distributed on the electrode. The longer the ON duration is, the more energy the particle gains. The gained energy causes three phenomenon of the particles: (1) the particle is still moving and the energy gained at the next ON duration accelerates the particle; (2) the particle is motionless and contacts the electrode, and the energy gained at the next ON duration drives the particle to move toward the electrode; and (3) if particles with different polarities are in the same space, the particles with different polarities may attract each other after a previous ON duration, and separate in the next ON duration. The separated particles then move toward a corresponding electrode. During the OFF duration, the electrical field stops applying force to the particles and the particles may continue to move according to the energy gained in the previous ON duration, or the particles move due to the inter-molecular force between particles.

The described three phenomenon have the following disadvantages: (1) The energy gained by the particle during the ON duration is not large enough to overcome the inter-molecular force between particles or between a particle and the electrode; (2) The particle strikes the electrode or other particles with high speed, thus, the particle may be moved or rebounded and this may cause unrecoverable damage to the particles and the electrode; and (3) The particles may be malformed due to the compression caused by the electrical field. The area that the particle touches the electrode may be enlarged and the structure or the characteristic of the particle or the electrode may be changed or affected.

FIGS. 2*a*, 2*b* and 2*c* are schematic diagrams of conventional driving methods. Please refer to FIG. 2*a*. The conventional driving method shown in FIG. 2*a* uses a single pulse to drive the particle. This may cause the particle to strike the electrode or other particles at high speed, and the driven particle may continuously squeeze other particles. This may cause unrecoverable damage to the particles and electrode.

Please refer to FIG. 2*b*. The conventional driving method shown in FIG. 2*b* uses multiple pulses to drive the particle, wherein a ratio between the ON duration and the OFF duration is fixed, to let the particle move with lower energy, and the particle can be stopped due to the inter-molecular force between the particle and the electrodes during the OFF duration. This driving method requires a longer OFF duration and the total driving time is increased accordingly.

Please refer to FIG. 2*c*. The conventional driving method shown in FIG. 2*c* drives the particles to quickly move from one side to another side by adjusting the ON duration, and the total driving time can be reduced. However, this cannot prevent the situation where the particles may directly strike the electrode or other particles at high speed.

BRIEF SUMMARY OF THE INVENTION

The embodiments of the invention provide driving methods for a display unit. When driving the display unit, the proposed driving method provides an electrical field, which is opposite to the electrical field used in the ON duration, and thus in the OFF duration to achieve the following objectives: (1) reduce the energy generated when the particle strikes other particles or the electrode, and increase the life time of the particles and the electrodes; and (2) provide an opposite electrical field to cancel or reduce the inter-molecular force between particles or between the particle and the electrode, thus, the particles can be easily moved due to the attraction force from other particles or the electrode. The attraction force can reduce the rearranging time of the particles, and the rearranged particle becomes more ordered. In another example, the particles suppressed on the electrode can first recover their shape to reduce the contact area between the particle and the electrode during the ON duration.

An embodiment of the invention provides a driving method for a display unit, wherein the display unit comprises a first electrode, and a second electrode disposed opposite to the first electrode, wherein the first electrode is separated from the second electrode by a distance, and a first particle with a polarity is distributed between the first electrode and the second electrode. The driving method comprising the steps of: casting a first voltage difference between the first electrode and the second electrode to make the first particle move toward the second electrode; stopping casting of the first voltage difference; and casting a second voltage difference between the first electrode and the second electrode to apply an opposite force to drive the first particle, wherein the polarity of the second voltage difference is different from that of the first voltage difference.

Another embodiment of the invention provides a display driving method for a display unit, wherein the display unit comprises a first electrode, and a second electrode disposed opposite to the first electrode, wherein the first electrode is separated from the second electrode by a distance, and a first particle with a polarity is distributed between the first electrode and the second electrode. The driving method comprising the steps of: casting a first voltage difference for a first duration to make the first particle move toward the second electrode; stopping casting of the first voltage difference for a second duration; casting a reversed voltage difference of the first voltage difference for a third duration for stopping the first particle; and stopping casting of the reversed voltage difference for a fourth duration.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
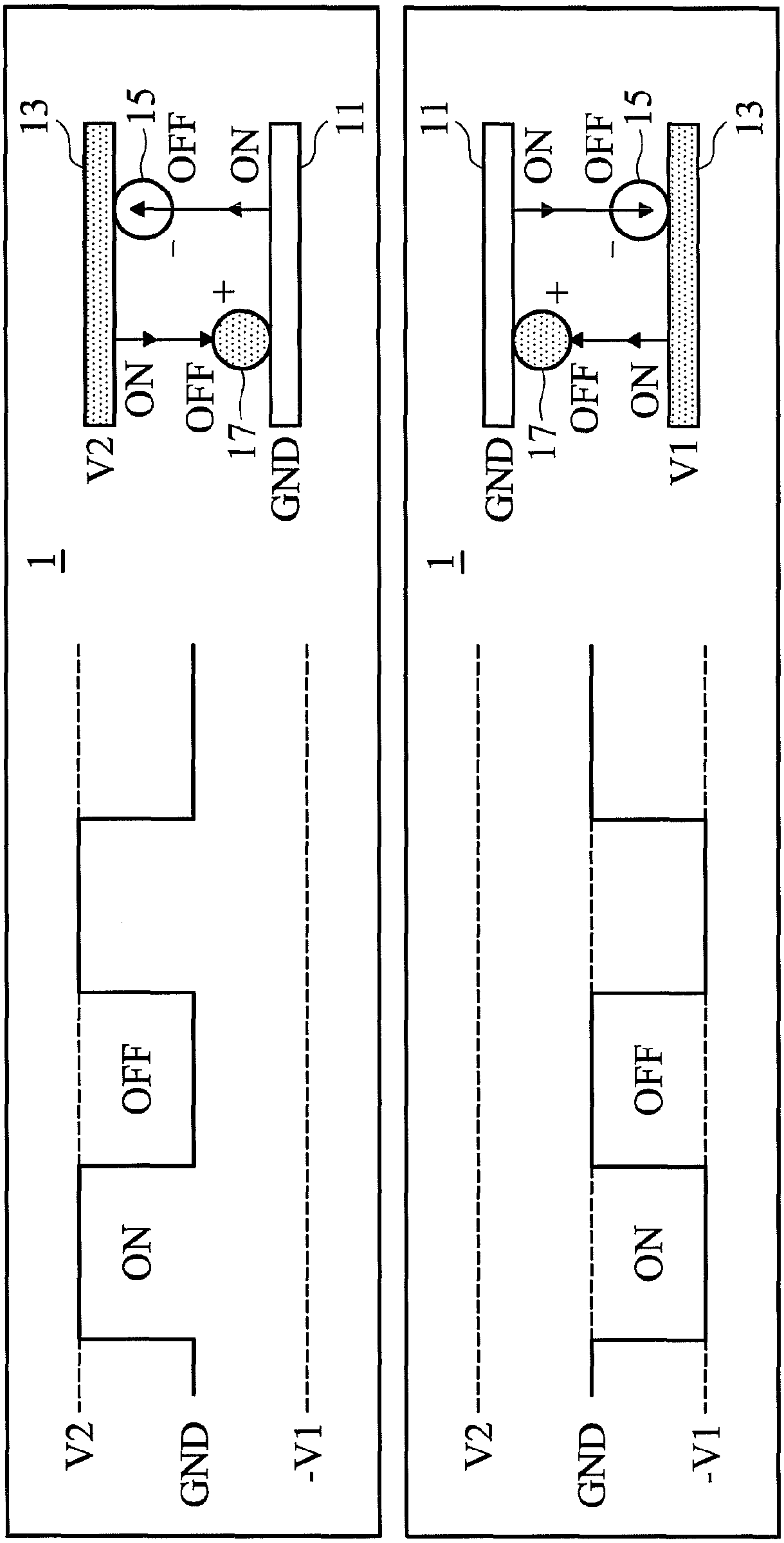
FIG. 1 ( PRIOR ART )
FIG. 1 is a schematic of a conventional display unit and a driving method thereof.
Figure 2A:
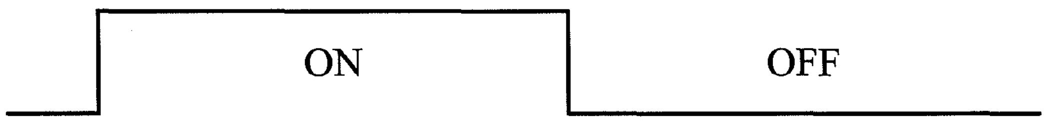
FIG. 2A (PRIOR ART)
FIGS. 2*a*, 2*b* and 2*c* are schematic diagrams of conventional driving methods.
Figure 2B:
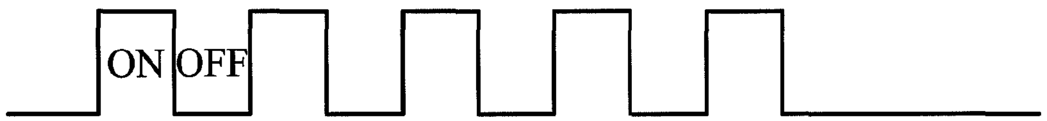
FIG. 2B (PRIOR ART)
Figure 2C:
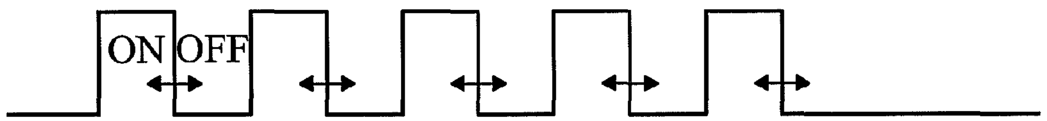
FIG. 2C (PRIOR ART)
Figure 3:
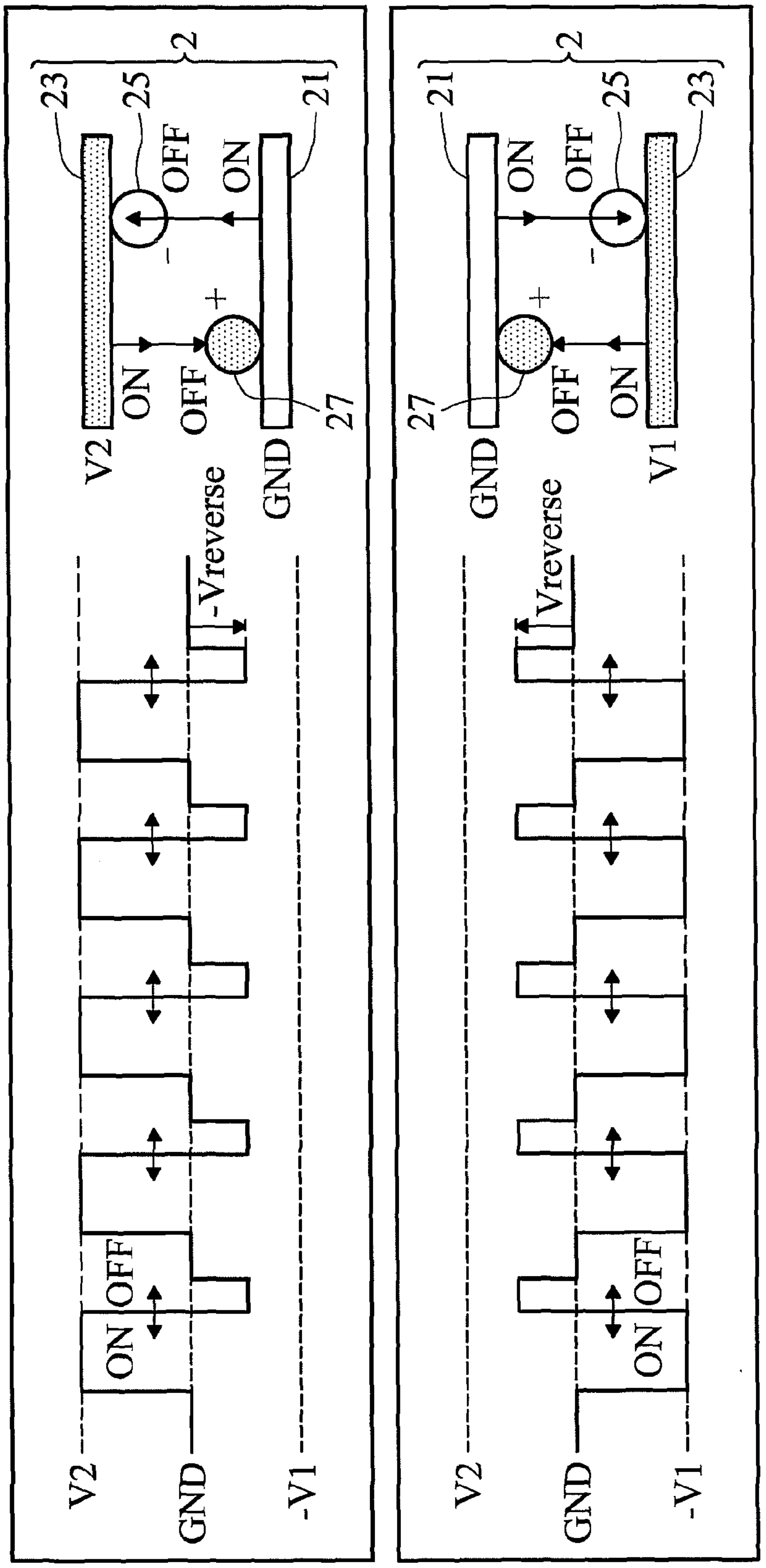
FIG. 3 is a schematic diagram of a display unit and a driving method of the display unit.

FIG. 3 is a schematic diagram of a display unit and a driving method of the display unit. As shown in FIG. 3, the embodiment of the invention can be applied to the display unit technology field, wherein the display unit is applied to an electric paper display or other similar display devices with charged-particles. In FIG. 3 the embodiment provides two driving methods with little differences shown in the upper part and the bottom part of FIG. 3, respectively. First, the driving method shown in the upper part of FIG. 3 will be described.

As shown in the upper part of FIG. 3, the display unit 2 at least comprises a first electrode 21 and a second electrode 23. The closed space formed and defined by the first electrode 21, the second electrode 23 and the body (not shown in FIG. 3) of the display unit 2 contains two particles with different colors and polarities, such as a first particle 25 and a second particle 27. In FIG. 3, only one first particle 25 and one second particle 27 are shown for only brevity, but not limit this invention. The first particle 25 here has a white color and negative charges, and the second particle 27 has a black color and positive charges. At least one surface of the display unit 2 is transparent so as to let the light in, and then let the light reflect through the surface of particles with different colors. Thus, the number and the color of the particles close to a transparent surface determine the color or the gray level shown by the display unit 2 in an user's aspect. In the static state before driving the particles, the first particle 25 may contact the first electrode 21, and the second particle 27 may contact the second electrode 23. The state shown in the upper part and the bottom part of FIG. 3 show the moving direction and the position of the particles after being driven, respectively.

The positions of the particles can be adjusted by adjusting the voltages applied to the electrodes, and the duration and the polarity of the voltages applied. In this embodiment when a negative voltage is applied to the first electrode 21, and a positive voltage is applied to the second electrode 23, a voltage difference (or electrical field) $V_2$ is formed (as shown in the bottom part of FIG. 3). Once the magnitude of the voltage difference $V_2$ is larger than the attraction force that causes the particle to be attached to the surface of the electrode, the particle starts to move along the electrical field. Thus, in this embodiment, the second particle 27 moves from the second electrode 23 to the first electrode 21, and the first particle 25 moves from the first electrode 21 to the second electrode 23. If an user looks at the transparent surface of the first electrode 21, the user sees a black color. Thus, in order to move the particles, the strength of the electrical field must be larger than the attraction force between the particle and the electrode, i.e., the voltage difference applied to the electrodes must be larger than a threshold voltage, which is the minimum voltage that causes the particle to overcome the attraction force between the particle and the electrode. The particles then move according to the duration that the voltage difference is applied to the electrodes, and the strength of the electrical field and the amount of the charges that are carried on the particles ($Fe=qE=ma$; $v=at$). When stopping casting of the voltage difference on the electrodes, the particle still moves due to the created inertia until one of the following occurs: (1) the particle is slowed down and stopped due to the inter-molecular force between particles or (2) the particles strike the electrode and then be stopped.

The described problem happens due to the reason that the conventional technology stops the particles by using the inter-molecular force or letting the particles directly strike the electrode to stop. However, if the strength of the electrical field is not larger enough, the moving distance of the particles is not long enough and the particles cannot get enough energy to push other particles. Therefore, the particles cannot be arranged in order, and the contrast of the display becomes worse. Note that if a larger electrical field is applied, other described problems may be happened.

Back to FIG. 3, wherein another phenomenon of charge exchanging is described in the following. The second particle 27 initially contacts the first electrode 21 (as shown in the upper part of FIG. 3). When a first voltage $V_2$ is applied to the first electrode 21, the voltage level of the first electrode 21 is higher than the voltage level of the second electrode 23, i.e. a voltage difference V2 created between the first electrode 21 and the second electrode 23, and thus the second particle 27 is moved from the first electrode 21 toward the second electrode 23. If the second particle 27 contacts the second electrode 23 before stopping casting of the first voltage $V_2$, the second particle 27 exchanges charges with the second electrode 23 in the contacting area. Therefore, if the voltage level of the second electrode 23 is lower than the voltage level of the surface of the second particle 27, the voltage level of the surface of the second particle 27 becomes lower due to charge exchanging. When a second voltage $-V_1$ is applied to the second electrode 23, the second particle 27 exchanges charges with the second electrode 23 in the contacting area (as shown in the bottom part of FIG. 3).

(1) If the second electrode 23 is grounded, the voltage level of the surface of the second particle 27 becomes 0;

(2) If the second electrode 23 is coupled to the second voltage $V_2$, the voltage level of the surface of the second particle 27 becomes the second voltage $V_2$.

According to the method in the present invention, the second voltage is smaller than a threshold voltage, which is a minimum voltage that helps the particle to overcome an inter-molecular forces between other particles or the electrode. Furthermore, the electrical field in the durations Toff_1 (as shown in the FIG. 4 and will be described later) and the reverse field or the second voltage applied can adjust the charges of the second particle.

Furthermore, a passivation layer covers contacting surfaces of the electrodes, so that damages when the particles strike the electrode can be prevented.

Figure 4A:
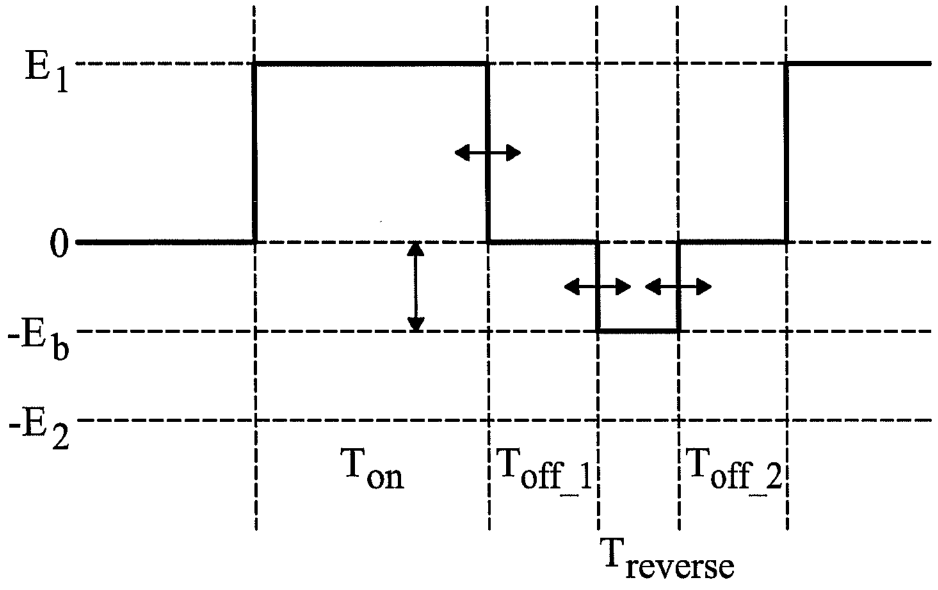
FIGS. 4A and 4B are schematic diagrams of two driving methods of the display unit of FIG. 3 according to embodiments of the invention.
Figure 4B:
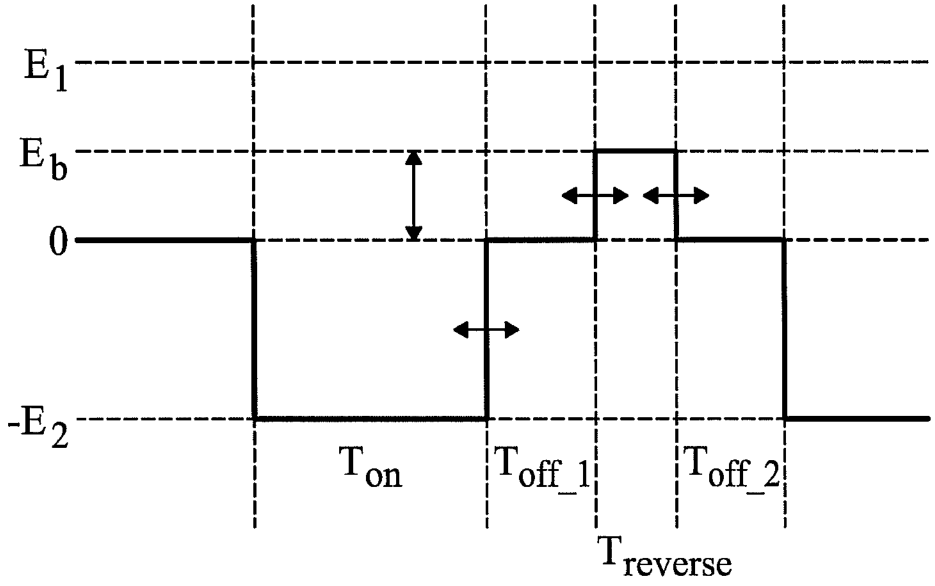

Please refer to FIGS. 3, 4A and 4B, wherein FIGS. 4A and 4B are schematic diagrams of two driving methods of the display unit 2 of FIG. 3 according to embodiments of the invention. As shown in FIGS. 4A and 4B, wherein $E_1$, $E_b$, and $E_2$ respectively represents the magnitude of the electrical field generated by applying different voltages to the electrodes 21 and 23. The positive and negative symbols represent the direction of the electrical field, and the value represents the magnitude of the electrical field. The embodiment is illustrated with $V_2$ and $-V_1$ in the following description. $T_{on}$, $T_{off}$_1, Toff_2 and $T_{reverse}$ represent the time periods that the electrical field is being casted, respectively. Take the upper part of FIG. 3 for example, the driving method according to an embodiment of the invention comprises the steps of:

(1) casting a first voltage difference $V_2$ between the first electrode 21 and the second electrode 23 to make the first particle 25 move toward the second electrode 23;

(2) stopping casting of the first voltage difference $V_2$;

(3) casting a second voltage difference $-V_1$ between the first electrode 21 and the second electrode 23 to decelerate the first particle 25 moving toward the second electrode 23, wherein the polarity of the second voltage difference $-V_1$ is different from the polarity of the first voltage difference $V_2$.

In the described steps (1), (2) and (3), we can apply the same driving procedure to the second particle 27 which has an opposite polarity of the first particle 25. The movement of the second particle 27 is contrary to the movement of the first particle 25 in the described steps (1), (2) and (3). Furthermore, the first voltage difference $V_2$ and the second voltage difference $-V_1$ may be implemented by casting the first voltage difference $V_2$ or the second voltage difference $-V_1$ only on the first electrode 21, or only on the second electrode 23, or casting two different voltages to both the first electrode 21 and the second electrode 23, and wherein a voltage difference of the two different voltages is the first voltage difference $V_2$ or the second voltage difference $-V_1$. Moreover, in the step (3), the first particle 25 and the second particle 27 may be contacted, stopped or partially stick to the electrodes 21 and 23. Thus, damages to the electrodes and the particles can be avoided.

The feature of the invention is that the direction of a new electrical field is contrary to the direction of the electrical field applied during the $T_{on}$ time period. Thus, the particles 25 and 27 are subjected to a non-contacting inverse force for: (1) slowing down; and (2) reducing the inter-molecular forces between other particles or the electrode. The duration of the new electrical filed, magnitude of the new electrical field, and the frequency of using the new electrical field can be adjusted according to the reflectance of the display unit, the distance between the two electrodes, the material characteristics of the particles, the starting position of the particles, temperature and other environment factors. Furthermore, the proposed driving methods of the invention can use one or multiple pulses to increase the performance of the display unit.

In still one embodiment, a ratio between the $T_{on}$ and $T_{reverse}$ ($T_{on}/T_{reverse}$) ranges from between 20% to 80%. Furthermore, a ratio between the strength of the electrical field $E_b$ and the strength of the electrical field $E_1$ ($E_b/E_1$) ranges from between 20% to 70%. In other words, if one of the two electrodes is grounded, the strength of the electrical field is directly proportional to the voltage applied to the other electrode, and a ratio between the magnitude of the voltage applied during $T_{on}$ and the magnitude of the voltage applied during $T_{reverse}$ ranges from between 20% to 70%.

Figure 5:
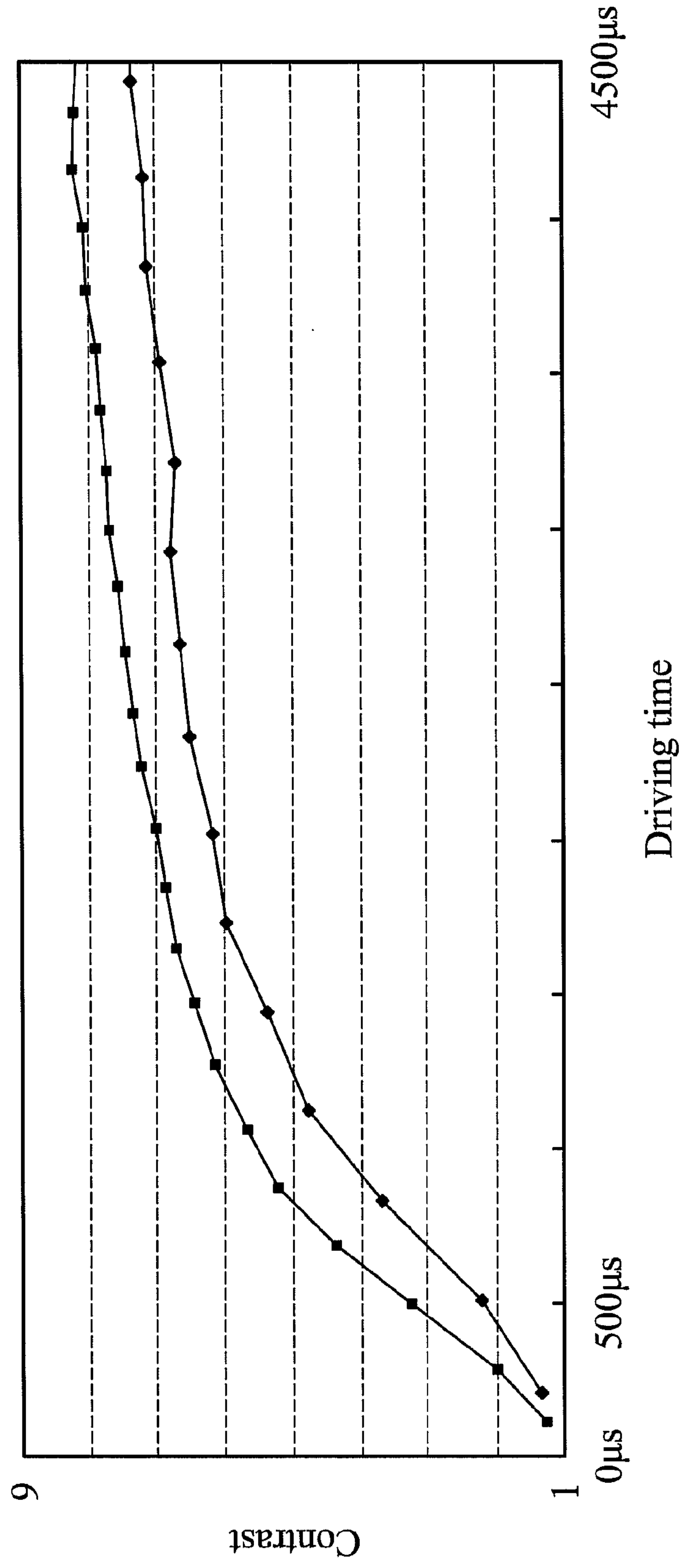
FIG. 5 is a comparison chart between the conventional driving method and a driving method of an embodiment of the invention.

Please refer to FIG. 5 which is a comparison chart between the conventional driving method and a driving method of an embodiment of the invention. The comparison chart focuses on the comparison of the contrasts and driving time periods. The design of the experiment was as follows:

(1) The pulse number was 20 and $T_{on}$ was 100 μs, wherein the pulse number is the number of consecutive pulses that were applied during the driving time of the driving method.

(2) The upper curve of FIG. 5 is the simulation result of the driving method of an embodiment of the invention, wherein $T_{off\_1}$ was 150 μs and no inversed voltage was output.

(3) The bottom curve of FIG. 3 is the simulation result of the conventional driving method, wherein $T_{off\_1}$ was 0 μs, $T_{break}$ was 50 μs, $T_{off\_2}$ was 10 μs.

According to FIG. 5, during the same time period, the contrast caused by the driving method of the embodiment of the invention was higher than the contrast caused by the conventional driving method. Furthermore, the driving method of the embodiment of the invention provided a higher maximum contrast degree than the conventional driving method can provide. In other words, the driving methods of the invention can increase the contrast of the display, and reduce the driving time. Please refer to Tables 1, 2 and 3, wherein Tables 1, 2 and 3 are the comparison tables between the conventional driving method and a driving method of the embodiment of the invention according to different factors, such as driving time, contrast, and time consumption. According to the described Tables 1, 2 and 3, it is shown that the proposed display driving method has a significant improvement over the conventional display driving method.

TABLE 1

| | Convention Driving time (ms/per line) | The invention Driving time (ms/per line) |
|---|---|---|
| Display panel | 5 | 2.8 |

TABLE 2

| | Convention Contrast | The invention Contrast |
|---|---|---|
| Display panel | 7.25 | 8.62 |

TABLE 3

| | | Convention | The invention |
|---|---|---|---|
| Display panel | Twon | 100 μs | 100 μs |
| | Tgnd | 150 μs | 0 μs |
| | Treverse | 0 μs | 40 μs |
| | Pulse number | 20 | 20 |

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A driving method for a display, wherein the display comprises a first electrode, and a second electrode disposed opposite to the first electrode, wherein the first electrode is separated from the second electrode by a distance, and a first particle with a polarity is distributed between the first electrode and the second electrode, the driving method comprising the steps of:

casting a first voltage difference between the first electrode and the second electrode to make the first particle move toward the second electrode;

stopping casting of the first voltage difference; and casting a second voltage difference between the first electrode and the second electrode to decelerate the first particle moving toward the second electrode, wherein the polarity of the second voltage difference is different from that of the first voltage difference.

2. The method as claimed in claim 1, wherein the first particle contacts the first electrode before casting of the first voltage difference.

3. The method as claimed in claim 1, wherein the first particle is driven by the first voltage difference and moves to the second electrode with a constant velocity or a constant acceleration.

4. The method as claimed in claim 1, wherein the step of casting the first voltage difference may be implemented by casting the first voltage difference only to the first electrode or the second electrode, or casting two voltages to both the first electrode and the second electrode, wherein a voltage difference of the two voltages is the first voltage difference.

5. The method as claimed in claim 1, wherein the step of casting the second voltage difference may be implemented by casting the second voltage difference only to the first electrode or the second electrode, or casting two voltages to both the first electrode and the second electrode, wherein a voltage difference of the two voltages is the second voltage difference.

6. The method as claimed in claim 1, further comprising:

stopping the first particle and making the first particle contacting a surface of the second electrode.

7. The method as claimed in claim 1, wherein the first particle has a white color and negative charges.

8. The method as claimed in claim 7, wherein the display further comprises a second particle distributed between the first electrode and the second electrode, and the polarity of the second particle is different from that of the first particle.

9. The method as claimed in claim 8, further comprising:

stopping the second particle and making the second particle contacting a surface of the first electrode.

10. The method as claimed in claim 8, wherein the second particle has a black color and positive charges.

11. The method as claimed in claim 8, wherein the second particle contacts the second electrode before casting of the first voltage difference.

12. The method as claimed in claim 8, wherein the first voltage difference is large enough to overcome an attraction force between the first particle and the first electrode, or between the second particle and the second electrode.

13. The method as claimed in claim 12, wherein the first voltage difference is larger than a threshold voltage.

14. A display driving method for a display, comprising a first electrode, and a second electrode disposed opposite to the first electrode, wherein the first electrode is separated from the second electrode by a distance, and a first particle with a polarity is distributed between the first electrode and the second electrode, the driving method comprising the steps of:

casting a first voltage difference for a first duration to make the first particle move toward the second electrode;

stopping casting of the first voltage difference for a second duration;

casting a reversed voltage difference for a third duration for stopping the first particle; and stopping casting of the reversed voltage difference for a fourth duration.

15. The method as claimed in claim 14, wherein a total duration of the second duration, the third duration and the fourth duration is equal to the first duration.

16. The method as claimed in claim 14, wherein a ratio between the third duration and the first duration ranges from between 20% and 80%.

17. The method as claimed in claim 14, wherein the first particle originally contacts the first electrode, a threshold voltage is required for moving the first particle from a surface of the first electrode, and a ratio between the reversed voltage difference and the first voltage difference ranges from between 20% and 70%.

18. The method as claimed in claim 14, wherein the step of casting the first voltage difference may be implemented by casting the first voltage difference only to the first electrode or the second electrode, or casting two voltages to both the first electrode and the second electrode, wherein a voltage difference of the two voltages is the first voltage difference.

19. The method as claimed in claim 14, wherein the step of casting the reversed voltage difference may be implemented by casting the second voltage difference only to the first electrode or the second electrode, or casting two voltages to both the first electrode and the second electrode, wherein a voltage difference of the two voltages is the second voltage difference.

20. The method as claimed in claim 14, wherein the display further comprises a second particle distributed between the first electrode and the second electrode, and the polarity of the second particle is different from that of the first particle.

* * * * *